US012075239B2

(12) United States Patent
Perras et al.

(10) Patent No.: US 12,075,239 B2
(45) Date of Patent: Aug. 27, 2024

(54) PROCEDURES ENABLING V2X UNICAST COMMUNICATION OVER PC5 INTERFACE

(71) Applicant: InterDigital Patent Holdings, Inc., Wilmington, DE (US)

(72) Inventors: Michelle Perras, Montreal (CA); Saad Ahmad, Montreal (CA); Samir Ferdi, Kirkland (CA); Khalid Anwar, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 417 days.

(21) Appl. No.: 17/423,105

(22) PCT Filed: Jan. 20, 2020

(86) PCT No.: PCT/US2020/014278
§ 371 (c)(1),
(2) Date: Jul. 14, 2021

(87) PCT Pub. No.: WO2020/150706
PCT Pub. Date: Jul. 23, 2020

(65) Prior Publication Data
US 2022/0132307 A1    Apr. 28, 2022

(51) Int. Cl.
*H04W 12/0431* (2021.01)
*H04W 4/40* (2018.01)
(Continued)

(52) U.S. Cl.
CPC ........ *H04W 12/0431* (2021.01); *H04W 4/40* (2018.02); *H04W 12/06* (2013.01); *H04W 76/10* (2018.02); *H04W 92/18* (2013.01)

(58) Field of Classification Search
CPC .... H04W 12/0431; H04W 4/40; H04W 76/10
(Continued)

(56) References Cited

U.S. PATENT DOCUMENTS 9,071,991 B2 * 6/2015 Baek ................... H04W 28/065
10,924,912 B2    2/2021 Kim et al.
(Continued)

FOREIGN PATENT DOCUMENTS

CN    102598770 A    7/2012
CN    107920059 A    4/2018
(Continued)

OTHER PUBLICATIONS

3rd Generation Partnership Project (3GPP), TR 23.786 V0.10.0, "Technical Specification Group Services and System Aspects, Study on Architecture Enhancements for EPS and 5G System to Support Advanced V2X Services (Release 16)", Dec. 2018, pp. 1-109.
(Continued)

*Primary Examiner* — Anthony D Brown
(74) *Attorney, Agent, or Firm* — Flaster Greenberg P.C.

(57) ABSTRACT

Systems, methods, and instrumentalities are provided for vehicle to everything (V2X) service oriented link establishment. A first wireless transmit receive unit (WTRU) may broadcast a direct communication request message. The direct communication request message may include a first security context identifier (ID). The first WTRU may receive a direct security mode command message from a second WTRU. The direct security mode command message may include a second security context ID. The first may determine a third security context ID by combining the first security context ID and the second security context ID. The first WTRU may establish, using the third security context ID, a secure direct communication link with the second WTRU. The first WTRU may generate, based on the third security context ID, a security context entry for the secure direct communication link with the second WTRU.

21 Claims, 15 Drawing Sheets

(51) Int. Cl.
*H04W 12/06* (2021.01)
*H04W 76/10* (2018.01)
*H04W 92/18* (2009.01)

(58) Field of Classification Search
USPC .............................................................. 726/2
See application file for complete search history.

(56) References Cited

U.S. PATENT DOCUMENTS

| | | | |
|---|---|---|---|
| 2011/0103329 A1 | 5/2011 | Baek et al. | |
| 2018/0103108 A1* | 4/2018 | Kim | H04L 67/12 |
| 2018/0206089 A1 | 7/2018 | Cavalcanti et al. | |
| 2019/0174530 A1 | 6/2019 | Kim et al. | |
| 2020/0100088 A1 | 3/2020 | Kim et al. | |
| 2021/0021974 A1* | 1/2021 | Kim | H04W 4/12 |

FOREIGN PATENT DOCUMENTS

| | | |
|---|---|---|
| WO | 2018004322 A1 | 1/2018 |
| WO | 2018/128505 A1 | 7/2018 |

OTHER PUBLICATIONS

3rd Generation Partnership Project (3GPP), TR 33.833 V2.0.0, "Technical Specification Group Services and System Aspects, Study on Security Issues to Support Proximity Services (ProSe) (Release 14)", Dec. 2016, pp. 1-227.

3rd Generation Partnership Project (3GPP), TS 23.285 V15.0.0, "Technical Specification Group Services and System Aspects, Architecture Enhancements for V2X Services (Release 15)", Mar. 2018, pp. 1-36.

3rd Generation Partnership Project (3GPP), TS 23.303 V15.1.0, "Technical Specification Group Services and System Aspects, Proximity-Based Services (ProSe), Stage 2 (Release 15)", Jun. 2018, pp. 1-130.

3rd Generation Partnership Project (3GPP), TS 33.303 V15.0.0, "Technical Specification Group Services and System Aspects, Proximity-Based Services (ProSe), Security Aspects (Release 15)", Jun. 2018, pp. 1-90.

* cited by examiner

PROCEDURES ENABLING V2X UNICAST COMMUNICATION OVER PC5 INTERFACE

CROSS-REFERENCE TO RELATED APPLICATION

This application is the National Stage Entry under 35 U.S.C. § 371 of Patent Cooperation Treaty Application No. PCT/US2020/014278, filed Jan. 20, 2020, which claims the benefit of U.S. Provisional Application Ser. No. 62/794,052 filed Jan. 18, 2019, the contents of which are incorporated by reference herein.

BACKGROUND

ProSe direct communication may be utilized to establish communication paths between two or more proximity services (ProSe)-enabled wireless devices. A ProSe direct communication, for example, between two wireless devices may be set up by establishing a layer-2 link over a PC5 reference point between them. The layer-2 link may be secured.

SUMMARY

A first wireless transmit receive unit (WTRU) may send (e.g., via broadcast) a direct communication request message. The direct communication request message may include a first security context identifier (ID). The first security context ID may be associated with the first WTRU. The first security context ID may be or may include a set of most significant bits (MSBs) of a security key ID. The security ID may be a $K_{D\text{-}sess}$ ID. The first WTRU may receive a direct security mode command message from a second WTRU. The direct security mode command message may include a second security context ID. The second security context ID may be associated with the second WTRU. The second security context ID may include a set of least significant bits (LSBs) of a security key ID. The first WTRU may determine a third security context ID by combining the first security context ID and the second security context ID. The third security context ID may include the set of MSBs and the set of LSBs of the security key ID. The first WTRU may establish, using the third security context ID, a secure direct communication link with the second WTRU. The first WTRU may generate, based on the third security context ID, a security context entry for the secure direct communication link with the second WTRU. The direct communications request message may include a list of supported vehicle to everything (V2X) services. The direct security mode command message may indicate one or more V2X services from the list of supported V2X services.

The direct security mode command message may be a first direct security mode command message. The first WTRU may receive a second direct security mode command message from a third WTRU. The second direct security mode command message may include a fourth security context ID. The fourth security context ID may be associated with the third WTRU. The fourth security context ID may include a set of LSBs of a security key ID. The first WTRU may determine whether the fourth security context ID is the same as the second security context ID. On a condition that the fourth security context ID is the same as the second security context ID, the first WTRU may send a direct security mode reject message to the third WTRU. The first WTRU may receive a third direct security mode command message from the third WTRU, for example, in response to the direct security mode reject message. The third direct security mode command message may include a fifth security context ID. The fifth security context ID may be associated with the third WTRU. The fifth security context ID may include a set of LSBs of a security key ID.

A WTRU may receive a direct communication request message may include a first security context ID, for example, from an initiating WTRU. The WTRU may generate a second security context ID associated with the WTRU. The WTRU may send a direct security mode command message that may include a second security context ID to the initiating WTRU. The WTRU may receive a direct security mode complete message that may indicate that a secure direct communication link has been established between the WTRU and the initiating WTRU using a third security context ID. The third security context ID may include a set of MSBs and a set of LSBs of a security key ID (e.g., $K_{D\text{-}sess}$ ID). The set of MSBs of the security key ID may be or may include the first security context ID generated by the initiating WTRU, and the set of LSBs of the security key ID may be or may include the second security context ID generated by the WTRU.

The WTRU may receive a Direct Security Mode Reject message that may indicate that a conflict of a second security context ID (e.g., the LSBs of a potential security key ID). The WTRU may create a new security context ID associated with the WTRU (e.g., a fourth security context ID) and send a second direct security mode command message that may include to fourth security context ID to the initiating WTRU. The fourth security context ID associated with the WTRU may be combined with the first security context ID generated by the initiating WTRU to form a security key ID (e.g., $K_{D\text{-}sess}$ ID). For example, the MSBs of the security key ID may be or may include the first security context ID generated by the initiating WTRU, and the LSBs of the security key ID may be or may include the fourth security context ID generated by the WTRU. The WTRU may receive a direct security mode complete message that may indicate that a secure direct communication link has been established between the WTRU and the initiating WTRU using the security key ID (e.g., $K_{D\text{-}sess}$ ID).

DETAILED DESCRIPTION

Figure 1A:
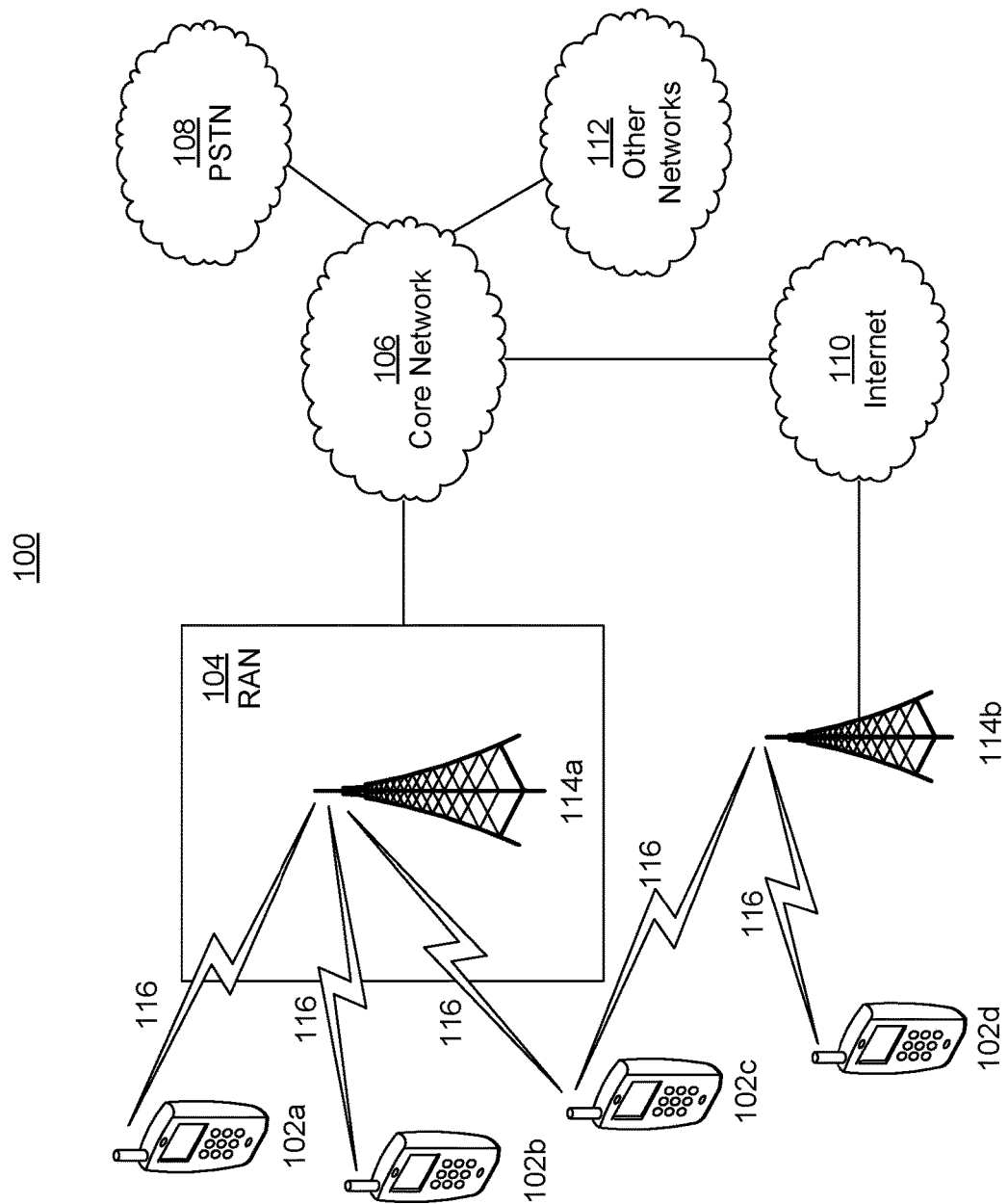
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi)), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
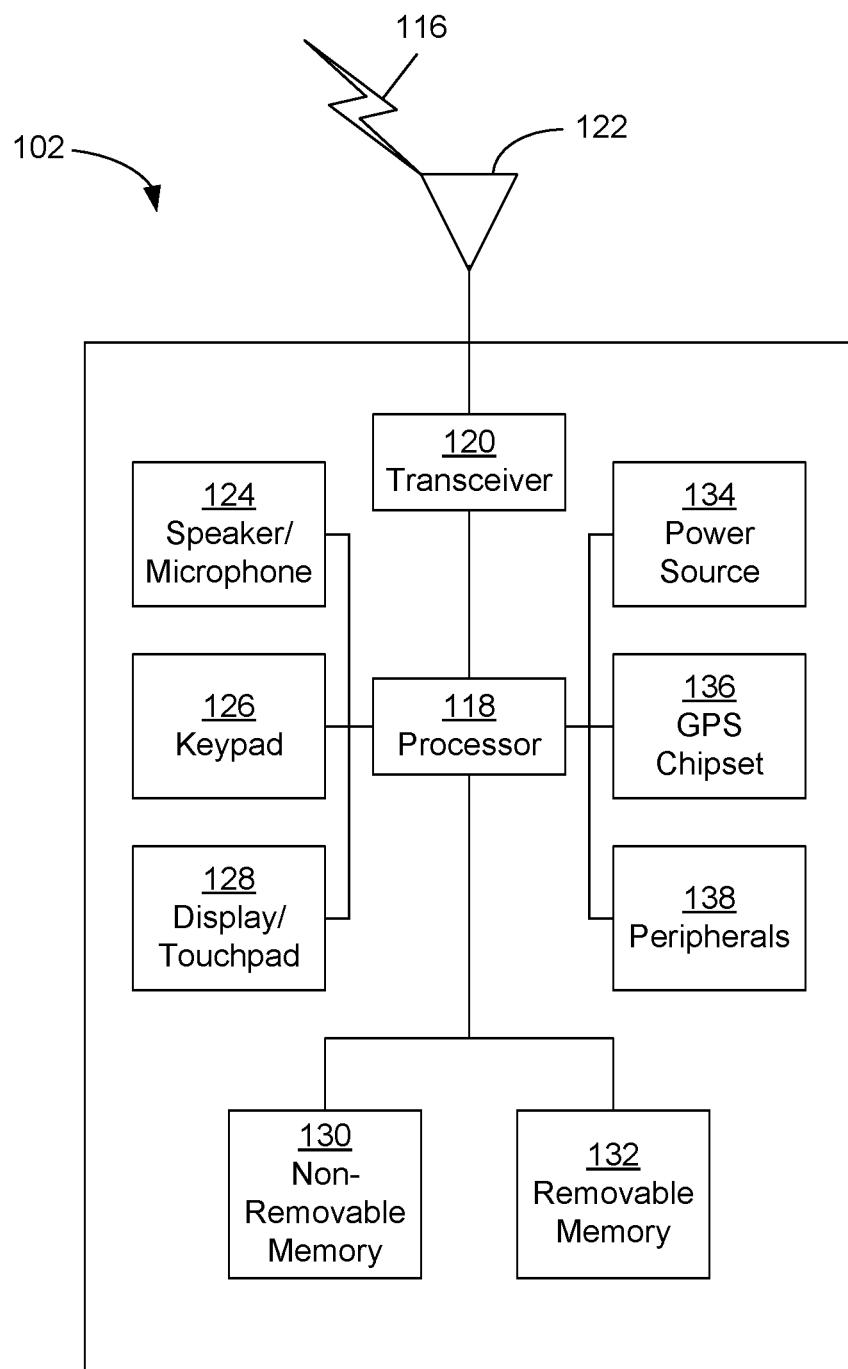
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
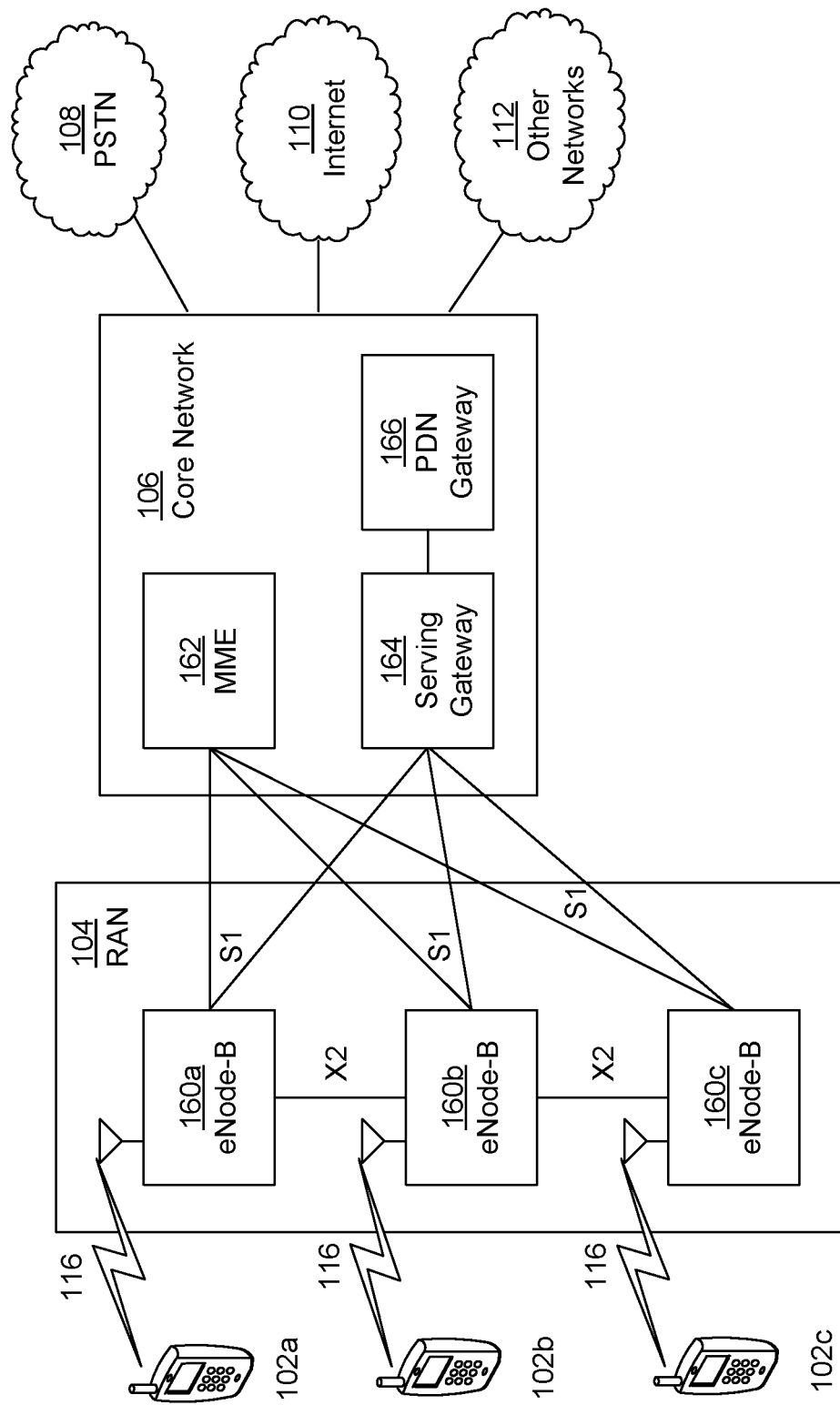
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
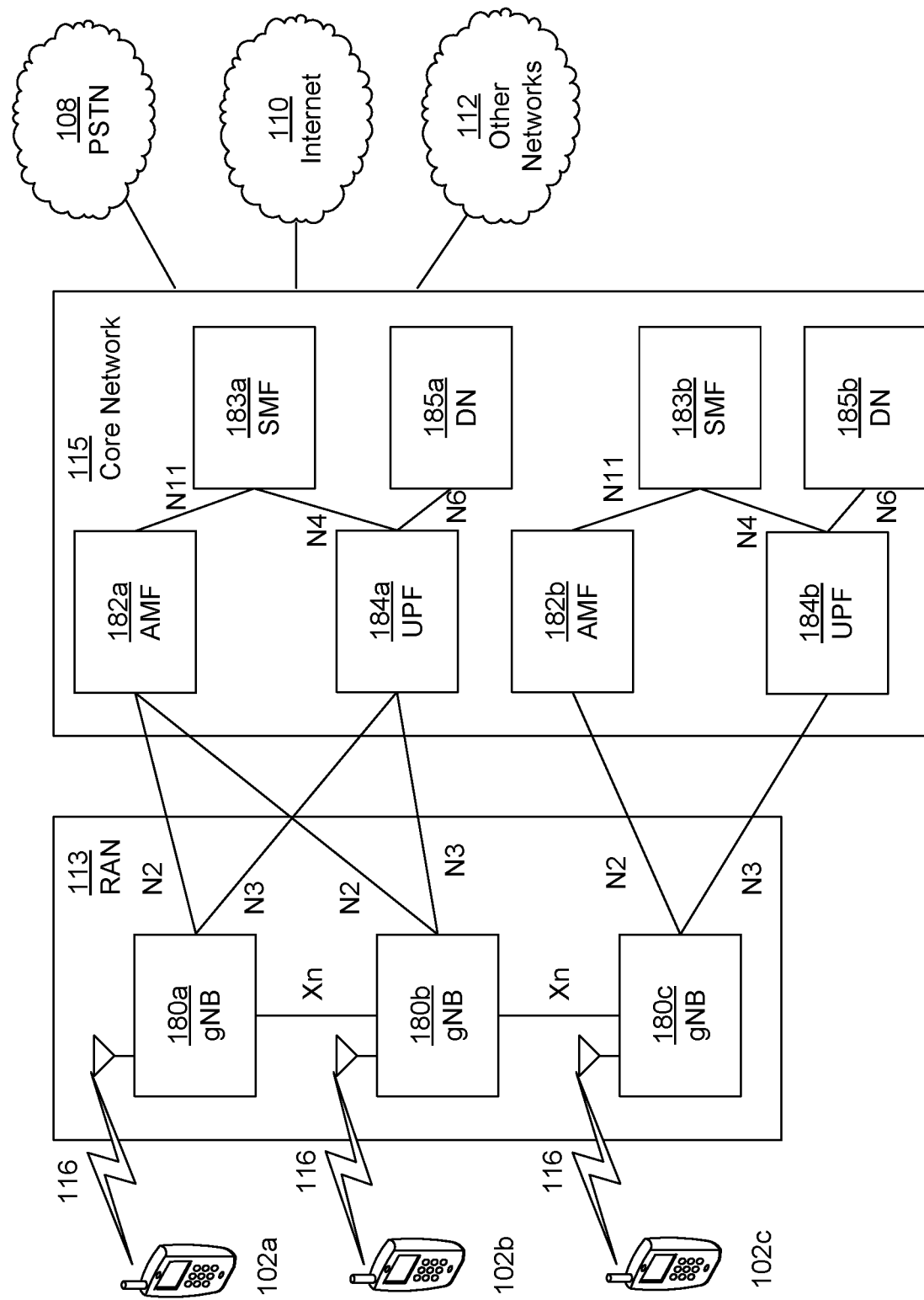
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are provided for vehicle to everything (V2X) service oriented link establishment. A security context of a link established between two wireless transmit receive units (WTRUs) on a PC5 reference point may be identified based on the least significant bits (LSBs) of an identifier (e.g., a $K_{D\text{-}sess}$ ID). A security context of a link established between two WTRUs on a PC5 reference point may be identified based on the complete identifier (e.g., a $K_{D\text{-}sess}$ ID).

A first WTRU may generate a broadcast message that includes information about a V2X service. The first WTRU may advertise the V2X service, for example, by including a V2X service indication when sending the broadcast message (e.g., one or more WTRUs including a second WTRU). The first WTRU may receive a direct communication request message from the second WTRU. The direct communication request message may include a set of most significant bits (MSBs) of a security key identifier, $K_{D\text{-}sess}$ ID.

The first WTRU may generate a set of least significant bits (LSBs) of the key identifier. The first WTRU may create a security context associated with the direct communication request message received from the second WTRU.

The first WTRU may send a direct security mode command message to the second WTRU. The direct security mode command message may include the generated LSBs of the key identifier and/or V2X service information.

A first WTRU may generate a broadcast message comprising information about a V2X service and a set of MSBs of a key identifier. The first WTRU may receive a direct security mode command message from the second WTRU. The direct security mode command message may include a set of LSBs of a key identifier, $K_{D\text{-}sess}$ ID. The first WTRU may generate the key identifier by combining the set of generated MSBs of the key identifier and the received set of LSBs of the key identifier.

The first WTRU may determine whether the combined key identifier is unique. If the combined key identifier is unique, the first WTRU may generate a security context associated with the direct security mode command message received from the second WTRU. The security context may be identified based on the unique combined key identifier. The first WTRU may send a direct security mode complete message to the second WTRU.

If the key identifier is not unique, the first WTRU may send a direct security mode reject message to the second WTRU. The direct security mode reject message may include a cause value indicating that the set of LSBs of the key identifier is not unique. The first WTRU may then receive from the second WTRU another set of LSBs of the key identifier. The first WTRU may generate another security context using the other set of LSBs.

Figure 2:
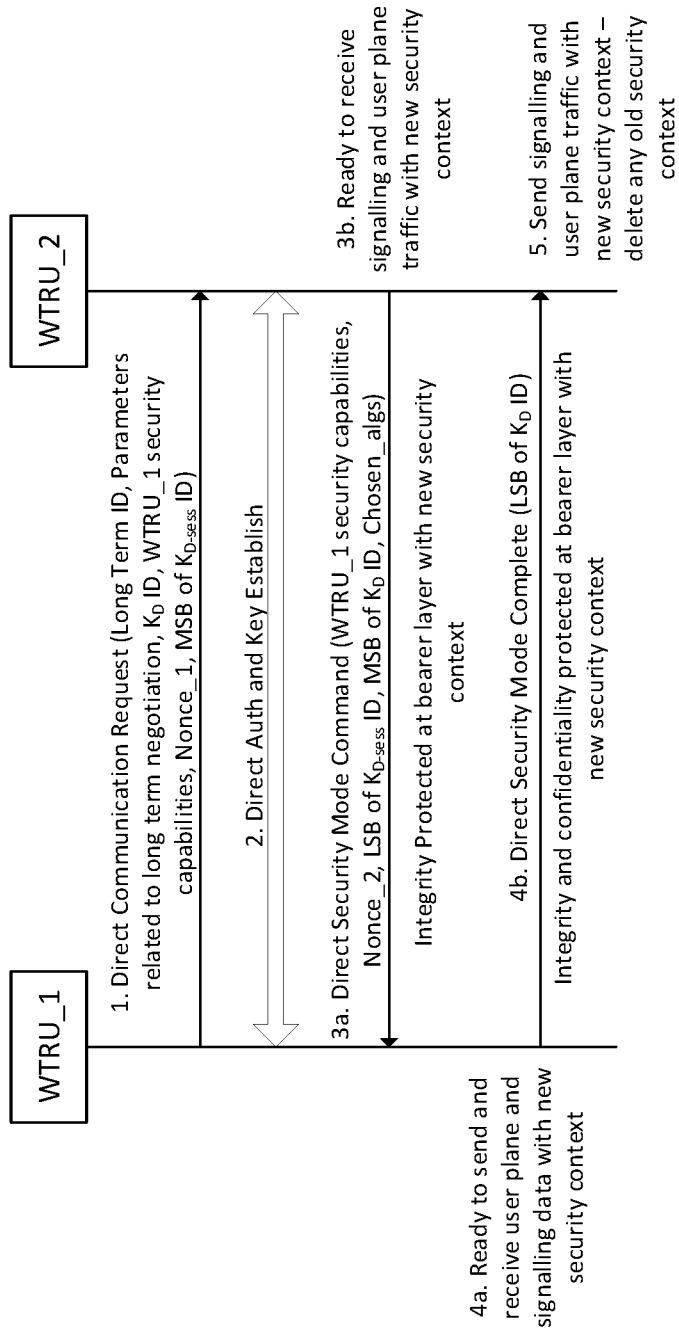
FIG. 2 illustrates an exemplary security association establishment during a direct link connection setup.

FIG. 2 illustrates an example of a security association establishment during a connection setup. A type of proximity services (ProSe) direct communication or a WTRU-to-WTRU communication (e.g., a vehicle-to-everything (V2X) communication) may be established over a PC5 reference point. A one-to-one ProSe direct communication may be implemented by establishing a secure layer-2 link over a PC5 reference point between two WTRUs, for example, an initiating WTRU (e.g., WTRU-1) and a target WTRU (e.g., WTRU-2). The initiating WTRU, WTRU-1, may initiate a direct link setup by generating a DIRECT_COMMUNICATION_REQUEST message. The terms DIRECT_COMMUNICATION_REQUEST message and Direct Communication Request message may be used interchangeably. Upon receiving a DIRECT_COMMUNICATION_REQUEST message, the initiating WTRU and the target WTRU may perform a link authentication, and establish a direct link security association. On completion of link authentication and a successful establishment of the direct link security association, the target WTRU may send a DIRECT_COMMUNICATION_ACCEPT message to the initiating WTRU. The terms DIRECT_COMMUNICATION_ACCEPT message and Direct Communication Accept message may be used interchangeably. The initiating WTRU may use the established link for the subsequent one-to-one communication with the target WTRU.

Multiple layers of keys (e.g., four different layers of keys) may be used, for example, in a ProSe direct one-to-one communication. The plurality of layers of keys may include a $K_D$ key, a $K_{D\text{-}sess}$ key, a ProSe Encryption Key (PEK), and/or a ProSe Integrity Key (PIK). There may be a 256 bit root key. The $K_D$ key may be shared between the two entities communicating using ProSe Direct one-to-one communication. A $K_D$ ID may be used to identify the $K_D$. The $K_{D\text{-}sess}$ key may be a 256 bit root key. The $K_{D\text{-}sess}$ key may be a root of an actual security context that is being used to protect the transfer of data between the two WTRUs. The keys that are used by confidentiality and integrity algorithms (e.g., the PEK and PIK) may be derived from the $K_{D\text{-}sess}$ key. A security context ID (e.g., a 16 bit $K_{D\text{-}sess}$ ID) may be used to identify the $K_{D\text{-}sess}$ key. The PEK and the PIK may be the session keys that may be used by a confidentiality algorithm and an integrity algorithm respectively. The PEK and the PIK may be used to protect ProSe direct one-to-one communication over a PC5 interface. The PEK and/or the PIK may be derived from a $K_{D\text{-}sess}$ key.

The target WTRU, for example in response to receiving a DIRECT_COMMUNICATION_REQUEST message, may initiate a direct security mode control procedure. The target WTRU may generate the LSBs of a $K_{D\text{-}sess}$ ID. The target WTRU may receive MSBs of $K_{D\text{-}sess}$ ID from an initiating WTRU, for example, via a DIRECT_COMMUNICATION_REQUEST message. The target WTRU may combine the LSBs of the $K_{D\text{-}sess}$ ID with the most significant bits (MSBs) of the $K_{D\text{-}sess}$ ID.

The target WTRU may generate a 128 bit Nonce_2 value. The target WTRU may derive the $K_{D\text{-}sess}$ using, for example, the $K_D$, a Nonce_1, and the Nonce_2. As illustrated in FIG. 2, the target WTRU may send a DIRECT_SECURITY_MODE_COMMAND message to the initiating WTRU. The target WTRU may include the Nonce_2 and the least significant 8 bits of the $K_{D\text{-}sess}$ ID in the DIRECT_SECURITY_MODE_COMMAND message. The terms DIRECT_SECURITY_MODE_COMMAND message and Direct Security Mode Command message may be used interchangeably. The initiating WTRU, for example, in response to receipt of the DIRECT_SECURITY_MODE_COMMAND message, may calculate a $K_{D\text{-}sess}$, a confidentiality key, and/or an integrity key. The initiating WTRU may calculate the $K_{D\text{-}sess}$ using, for example, the $K_D$, a Nonce_1, and the Nonce_2. As illustrated in FIG. 2, the initiating WTRU may send a DIRECT_SECURITY_MODE_COMPLETE message to the target UE. The terms DIRECT_SECURITY_MODE_COMPLETE message and Direct Security Mode Complete message may be used interchangeably. The initiating WTRU may form the $K_{D\text{-}sess}$ ID by combining the LSBs of $K_{D\text{-}sess}$ ID (e.g., received in the DIRECT_SECURITY_MODE_COMMAND message) with the MSBs of the $K_{D\text{-}sess}$ ID generated by the initiating WTRU.

$K_{D\text{-}sess}$ (e.g., the root of a security association) may be generated by the initiating WTRU and/or the transmitting WTRU. A portion of the $K_{D\text{-}sess}$ ID may be used (e.g., locally used) to identify a security context. For example, an initiating WTRU may use the 8 MSBs of the $K_{D\text{-}sess}$ ID to locate the $K_{D\text{-}sess}$ for a link. A target WTRU may use the 8 LSBs of the formed $K_{D\text{-}sess}$ ID to locate its $K_{D\text{-}sess}$ for the link. A security context may include one or more of the following information elements: $K_{D\text{-}sess}$, PEK, PIK, Remote UE User info, and/or $K_D$.

A WTRU may be configured to perform a service announcement and/or a unicast link establishment procedure for V2X services. Discovery Channel, as used in other ProSe contexts, may not be available for a V2X context. A service announcement mechanism may be used in V2X communications, for example, to inform a peer WTRU of the existence of a WTRU. Capabilities of the WTRU (e.g., V2X WTRU) may be communicated via the service announcement mechanism. The capabilities of the WTRU may include, for example, the services supported by the V2X WTRU. For example, a V2X WTRU may inform a peer WTRU about its capability of supporting a unicast communication. Various mechanisms may be utilized for a V2X (e.g., an enhanced V2X (eV2X)) link establishment. The mechanisms may include a WTRU oriented layer-2 link establishment and/or a V2X service oriented layer-2 link establishment.

Figure 3:
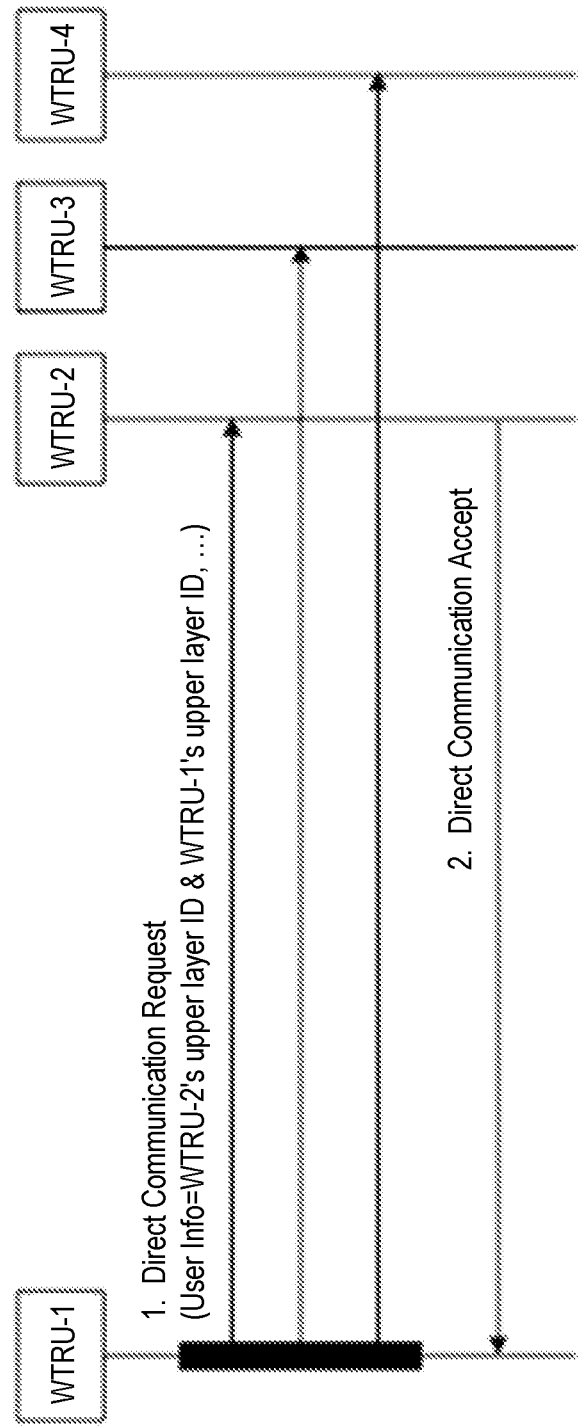
FIG. 3 illustrates an exemplary WTRU oriented layer-2 link establishment.

FIG. 3 illustrates an exemplary layer-2 link establishment mechanism that may be utilized for V2X. As illustrated in FIG. 3, in a layer-2 link establishment mechanism, a DIRECT_COMMUNICATION_REQUEST message may be sent by a first WTRU (e.g., WTRU-1) via broadcast mechanism, e.g., to a broadcast address associated with the application. For example, the first WTRU may broadcast the DIRECT_COMMUNICATION_REQUEST message. One or more WTRUs (e.g., WTRU-2, WTRU-3, and/or WTRU-4) may receive the DIRECT_COMMUNICATION_REQUEST message. The DIRECT_COMMUNICATION_REQUEST message may include an upper layer identifier of the second WTRU (e.g., WTRU-2). The upper layer identifier of the second WTRU in the DIRECT_COMMUNICATION_REQUEST message may be utilized to allow the second WTRU (e.g., WTRU-2) to decide whether to respond to the DIRECT_COMMUNICATION_REQUEST message received from the first WTRU (e.g., WTRU-1). The Source L2 ID of the DIRECT_COMMUNICATION_REQUEST message may be the unicast L2 ID of the first WTRU (e.g., WTRU-1). The second WTRU (e.g., WTRU-2) may use the source L2 ID of the received DIRECT_COMMUNICATION_REQUEST message as a destination L2 ID for a subsequent message to the first WTRU (e.g., WTRU-1). The second WTRU (e.g., WTRU-2) may use its own unicast L2 ID as the source L2 ID of the subsequent message to the first WTRU (e.g., WTRU-1). The first WTRU (e.g., WTRU-1) may obtain the second WTRU's (e.g., WTRU-2's) L2 ID for future communication, for example, for signaling traffic and/or for data traffic.

Figure 4:
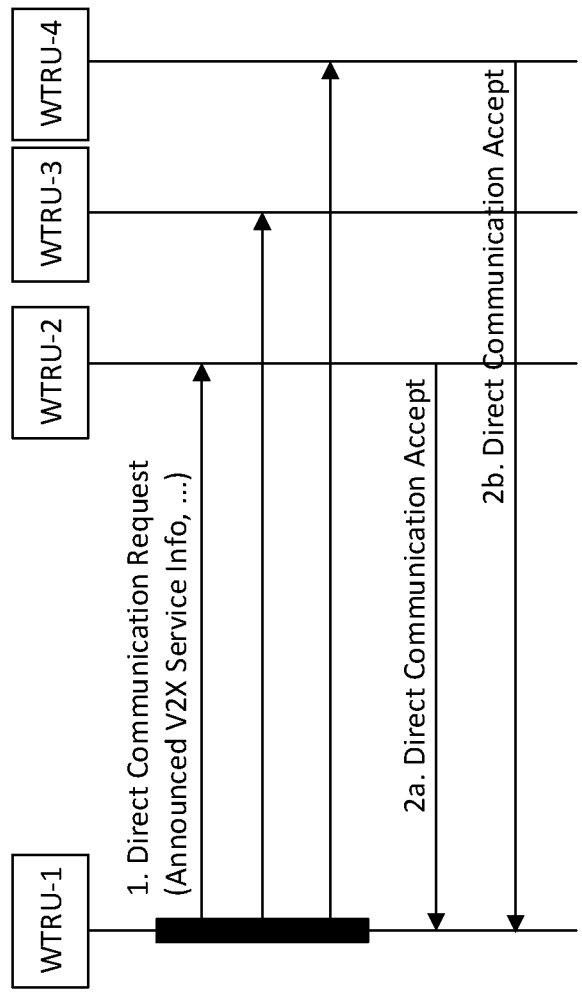
FIG. 4 illustrates an exemplary V2X service oriented layer-2 link establishment.

FIG. 4 illustrates an exemplary V2X layer-2 link establishment. As illustrated in FIG. 4, information about a V2X service requesting a L2 link establishment, e.g., information about an announced V2X service, may be included in a DIRECT_COMMUNICATION_REQUEST message. The information about the V2X service may enable other WTRUs (e.g., WTRU-2, WTRU-3, and/or WTRU-4) to decide whether to respond to the DIRECT_COMMUNICATION_REQUEST message. One or more WTRUs that are interested in using the V2X service announced by the DIRECT_COMMUNICATION_REQUEST message may respond to the request (e.g., WTRU-2 and WTRU-4 as illustrated in FIG. 4). The responding WTRUs (e.g., WTRU-2 and WTRU-4) may be interchangeably referred to as interested WTRUs, responding WTRUs, and/or peer WTRUs.

An initiating WTRU may broadcast a DIRECT_COMMUNICATION_REQUEST message. The broadcasted DIRECT_COMMUNICATION_REQUEST message may include information associated with a V2X service. One or more WTRUs may receive the broadcasted DIRECT_COMMUNICATION_REQUEST message including information about the V2X service. One or more WTRUs that are interested in using the V2X service may initiate a direct security mode control. The one or more interested WTRUs may send respective DIRECT_COMMUNICATION_ACCEPT messages to the initiating WTRU. The respective DIRECT_COMMUNICATION_ACCEPT messages may establish respective unicast links with the initiating WTRU (e.g., WTRU-1 in FIG. 4).

The interested WTRUs may reply to the broadcasted DIRECT_COMMUNICATION_REQUEST message. For example, each of the interested WTRUs may send a DIRECT_SECURITY_MODE_COMMAND message to the initiating WTRU. The DIRECT_SECURITY_MODE_COMMAND message(s) may create a security association with the initiating WTRU. The MSB of $K_{D\text{-}sess}$ ID may be used to locally identify a security association on the initiating WTRU (e.g., WTRU-1). The most significant 8-bits (MSB) may be the same for each $K_{D\text{-}sess}$ ID at the initiating WTRU (e.g., WTRU-1). The initiating WTRU (e.g., WTRU-1) may associate each of the interested WTRUs with the same security context. The $K_{D\text{-}sess}$ ID (e.g., the 8 MSBs from the initiating WTRU plus the 8 LSBs from the peer WTRU) may be unique for each of the one-to-one links between the initiating WTRU and the interested WTRUs. Since the same MSB $K_{D\text{-}sess}$ ID is referenced by multiple peer WTRUs, the security association for each of the links/sessions may or may not be unique.

Figure 5A:
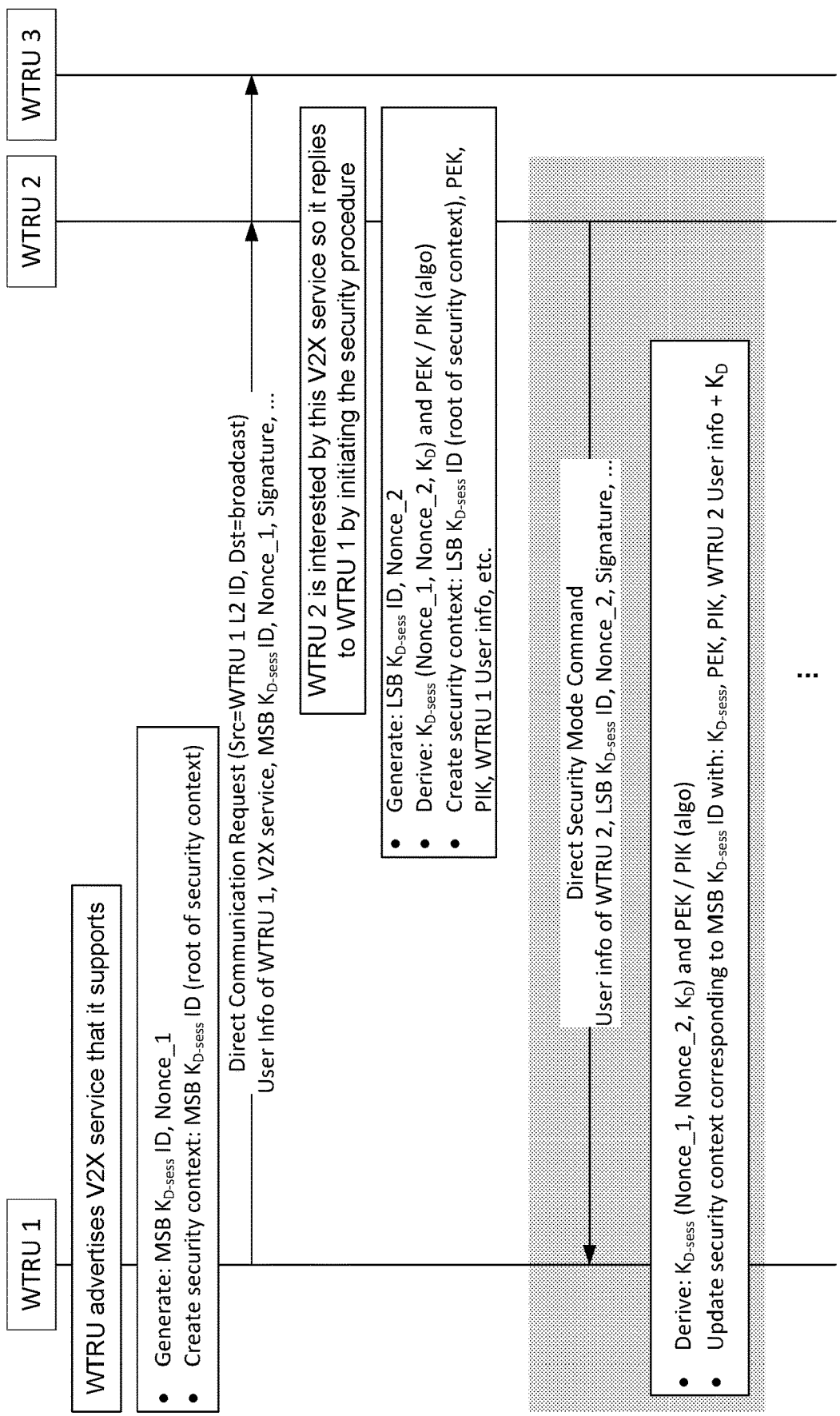
FIGS. 5A and 5B illustrate an exemplary V2X service oriented layer-2 link establishment, for example, where a security context is based on most significant bits of a $K_{D\text{-}sess}$ ID.
Figure 5B:
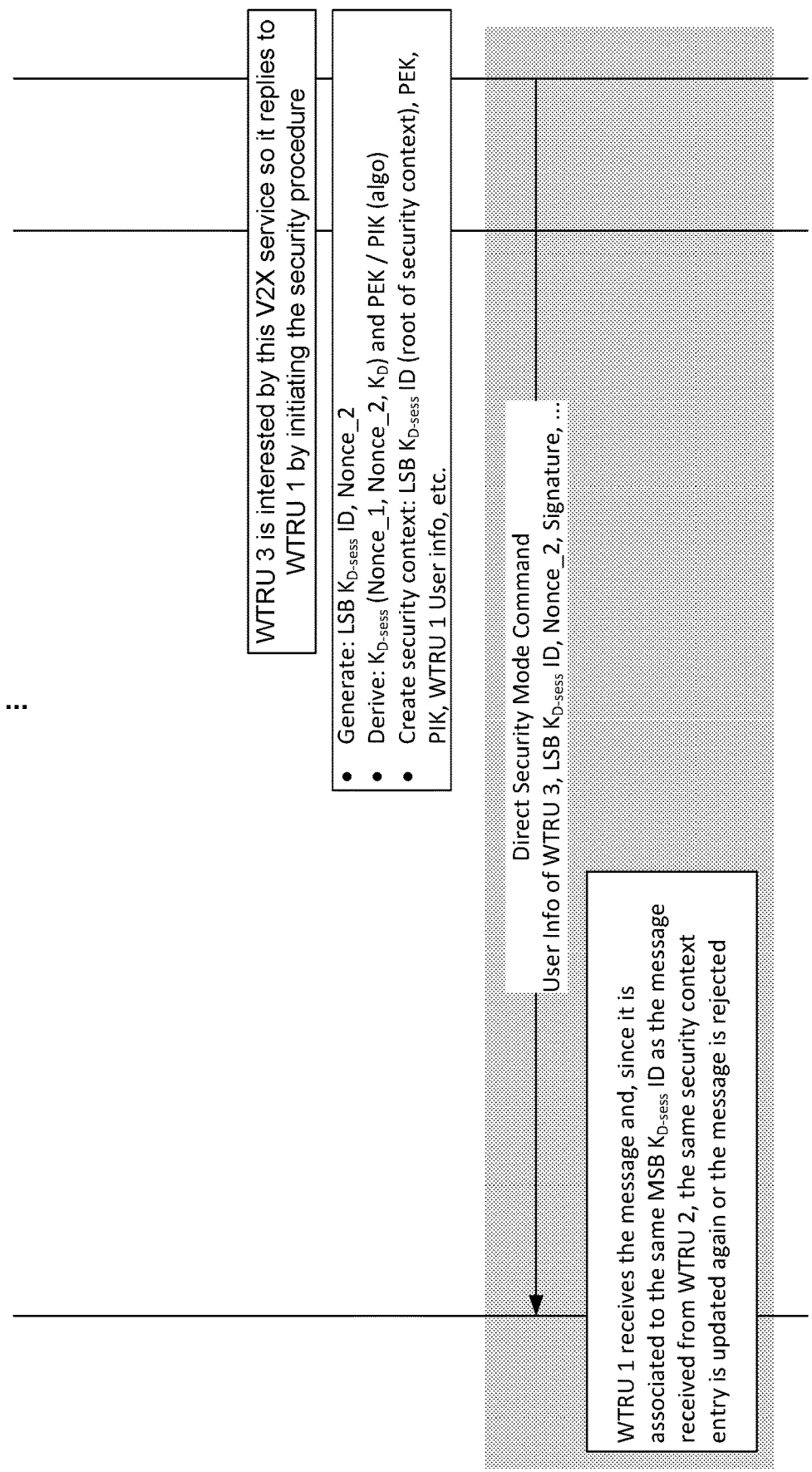

FIGS. 5A and 5B illustrate an exemplary V2X service oriented link establishment. As illustrated in FIGS. 5A and 5B, each of the interested WTRUs replying to the DIRECT_COMMUNICATION_REQUEST message may point to the same security association on the initiating WTRU side.

Referring to FIGS. 5A and 5B, a DIRECT_SECURITY_MODE_COMMAND message may be received by an initiating WTRU (e.g., a WTRU 1) from a first interested WTRU (e.g., WTRU 2). The initiating WTRU may create a security context entry identified by MSB $K_{D\text{-}sess}$ ID. The initiating WTRU may save information (e.g., Nonce 2, Chosen Algorithms) received in the DIRECT_SECURITY_MODE_COMMAND message with other information e.g. $K_{D\text{-}sess}$, PEK, PIK and $K_{D\text{-}sess}$ ID. The initiating WTRU may receive a second DIRECT_SECURITY_MODE_COMMAND message from a second interested WTRU (e.g., WTRU 3). The initiating WTRU (e.g., WTRU 1) may not update the security context with values received from the second interested WTRU (e.g., WTRU 3), as the keys from the first interested WTRU (e.g., WTRU 2) are already saved in this same security context entry. The security procedure used by the first interested WTRU (e.g., WTRU 2) and the second interested WTRU (e.g., WTRU 3) may be based on the same MSB $K_{D\text{-}sess}$ ID, each of the first interested WTRU and the second interested WTRU received from the initiating WTRU (e.g., WTRU 1).

In examples, one or more keys from the second interested WTRU may be saved (e.g., overriding the keys from the first interested WTRU (e.g., WTRU 2). As a result, communication with first interested WTRU may not be possible, as the one or more keys corresponding to the first interested WTRU may be lost. Loss of one or more keys corresponding to the first interested WTRU may result in security check failures in subsequent direct communications between the initiating WTRU (e.g., WTRU 1) and the first interested WTRU (e.g., WTRU 2).

In examples, one or more keys from the second interested WTRU (e.g., WTRU 3) may not be saved by the initiating WTRU (e.g., WTRU 1). The initiating WTRU (e.g., WTRU 1) may not be able to establish a security association with the second interested WTRU (e.g., WTRU 3). The link between the initiating WTRU and the second interested WTRU may not be established. It may not be possible for the initiating WTRU to simultaneously establish secure direct communications with multiple responding/interested WTRUs. One or more Nonce_2 values may be generated on each of the first interested WTRU and the second interested WTRU. For example, the one or more Nonce_2 values may be randomly generated on each of the two WTRUs. The one or more Nonce_2 values may have distinct values.

A service oriented and/or a WTRU oriented layer-2 link establishment may be implemented. A service oriented layer-2 unicast link establishment may be implemented for a service, for example, a V2X service in case of a V2X communication, or another service in case of other types of communications, e.g., communication between drones.

Figure 6A:
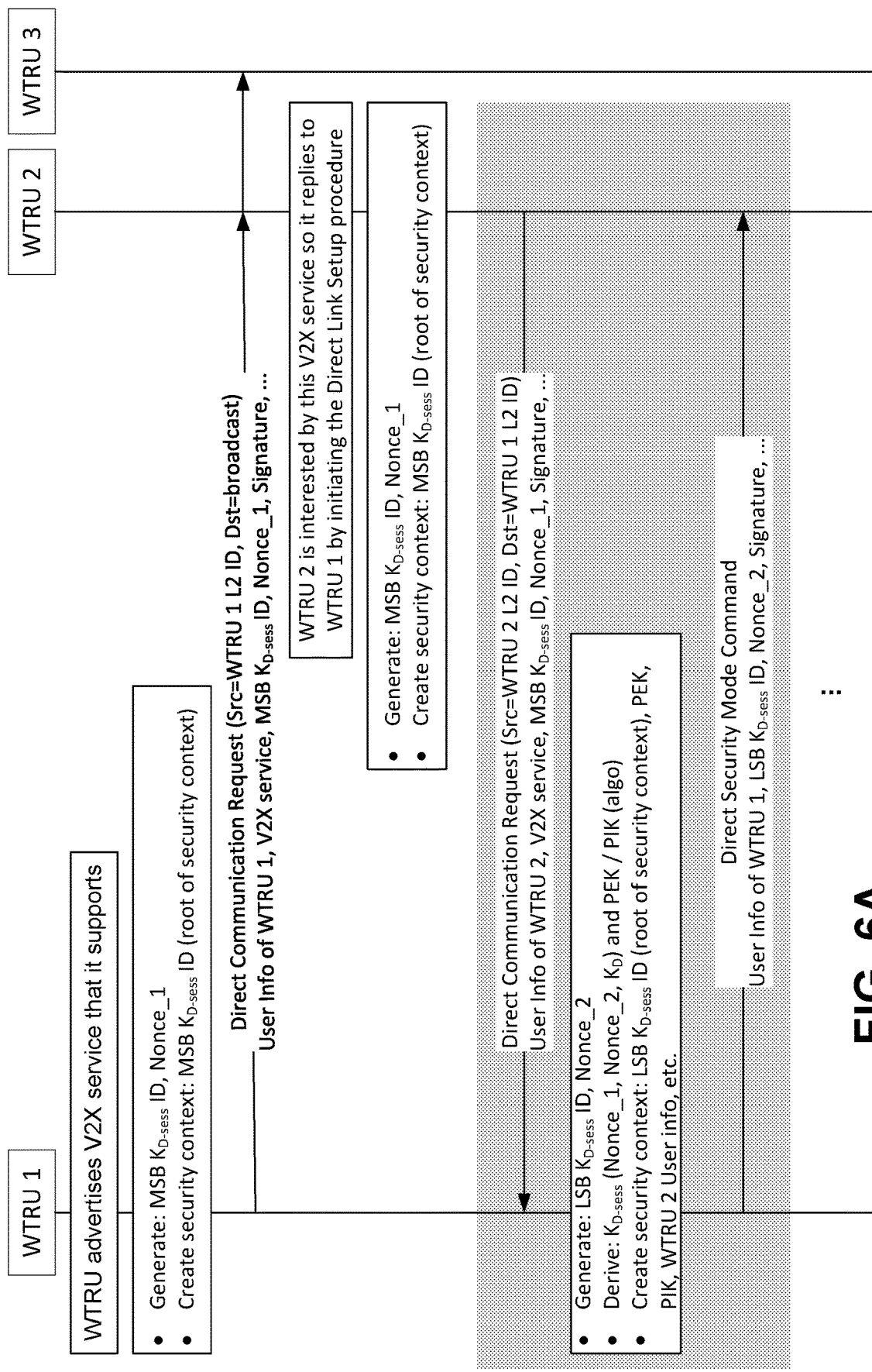
FIGS. 6A and 6B illustrate an exemplary V2X service oriented layer-2 link establishment, for example, where a security context is based on the least significant bits of a $K_{D\text{-}sess}$ ID.
Figure 6B:
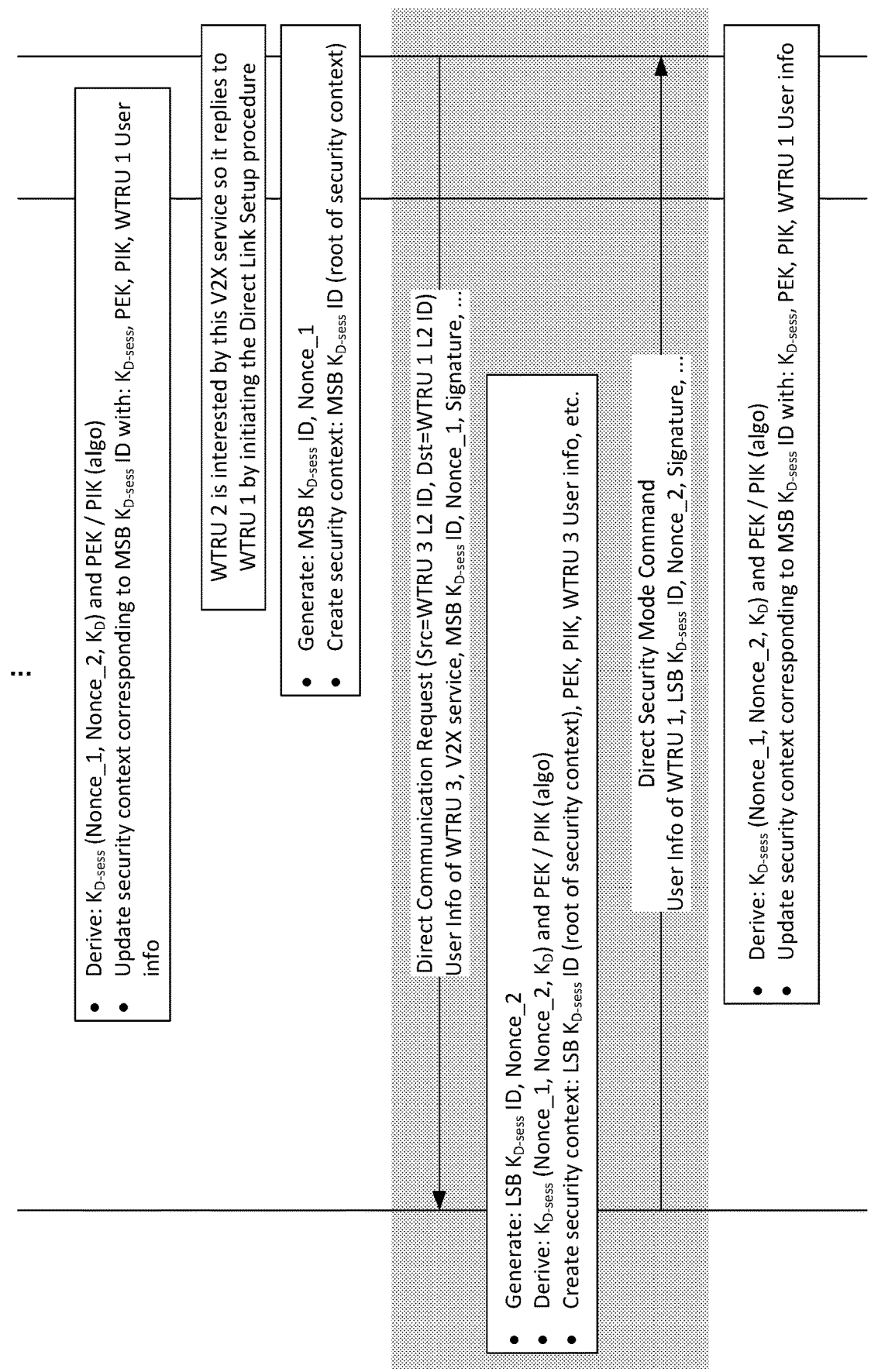

FIGS. 6A and 6B illustrate an exemplary V2X service oriented link establishment. As illustrated in FIGS. 6A and 6B, each of the interested WTRUs (e.g., WTRU 2 and WTRU 3) may receive a DIRECT_COMMUNICATION_REQUEST message from the initiating WTRU (e.g., WTRU 1). The DIRECT_COMMUNICATION_REQUEST message may include information about a V2X service. One or more of the interested WTRUs may determine that they are interested in the V2X service. The one or more interested WTRUs that are interested in the V2X service may initiate a unicast link establishment with the initiating WTRU, for example, by sending respective DIRECT_COMMUNICATION_REQUEST messages to the initiating WTRU. Each of the interested or peer WTRUs may initiate a unicast link establishment. The initiating WTRU, based on the received DIRECT_COMMUNICATION_REQUEST messages from the one or more interested WTRUs (e.g., WTRU 2 and WTRU 3) may create respective distinct security contexts on the initiating WTRU. A distinct security context index (e.g., based on LSBs of $K_{D\text{-}sess}$ ID) may be created for each of the peer or interested WTRUs. A distinct security context may be created by the initiating WTRU, for example, each time a DIRECT_COMMUNICATION_REQUEST message is received from a peer or interested WTRU.

As illustrated in FIGS. 6A and 6B, an interested WTRU or a peer WTRU (e.g., WTRU 2) may be the initiator of the link establishment setup. The DIRECT_COMMUNICATION_REQUEST message sent by the initiating WTRU (e.g., WTRU 1) may indicate a supported V2X service. One or more WTRUs interested in the indicated supported V2X service may initiate a link establishment with the initiating WTRU. The initiating WTRU (e.g., WTRU 1) may indicate, in the initial link establishment message, the MSB of a $K_{D\text{-}sess}$ ID that is set to a dummy value or to zero. Setting the MSB of $K_{D\text{-}sess}$ ID to a dummy value or zero may indicate that the value is not associated with a security context on the initiating WTRU (e.g., WTRU 1). In examples, the initiating WTRU (e.g., tWTRU 1) may leave the MSB of the $K_{D\text{-}sess}$ ID out of the DIRECT_COMMUNICATION_REQUEST message.

In examples, the initiating WTRU (e.g., WTRU 1) may indicate a supported V2X service in a different type of message (e.g. V2X_SERVICE_ANNOUNCEMENT, V2X_SERVICE_ADVERTISEMENT), for example, to reflect the true function of this initial message from the initiating WTRU (e.g., WTRU 1). The MSB of the $K_{D\text{-}sess}$ ID may be generated by the interested WTRUs or the peer WTRUs. For example, one or more WTRUs that are interested in the announced V2X service (e.g., WTRU 2 and WTRU 3) may generate a set of MSBs of the $K_{D\text{-}sess}$ ID. The initiating WTRU may generate a different set of LSBs of $K_{D\text{-}sess}$ ID for each direct link communication request received. The initiating WTRU may generate a distinct security context for each direct link communication request. Each security context may be indexed using LSBs of the $K_{D\text{-}sess}$ ID. The initiating WTRU (e.g., WTRU 1) may discard the initially created dummy MSB of the $K_{D\text{-}sess}$ ID that it sent in the initial broadcast DIRECT_COMMUNICATION_REQUEST message (e.g., to announce the V2X service).

As illustrated in FIGS. 6A and 6B, an interested WTRU (e.g., WTRU 2) may send a DIRECT_COMMUNICATION_REQUEST message to the initiating WTRU (e.g., WTRU 1). A destination field of the DIRECT_COMMUNICATION_REQUEST message may be set to the WTRU 1 L2 ID and a source field of the DIRECT_COMMUNICATION_REQUEST message may be set to the WTRU 2 L2 ID. The information associated with the V2X service announced by the initiating WTRU (e.g., WTRU 1) on the initial DIRECT_COMMUNICATION_REQUEST message (e.g., the service of interest for the interested WTRU, WTRU2) may be copied on the message sent by the interested WTRU (e.g., WTRU 2) to the initiating WTRU (e.g., WTRU 1).

Another interested WTRU (e.g., WTRU 3) may send a DIRECT_COMMUNICATION_REQUEST message to the initiating WTRU (e.g., WTRU 1). The DIRECT_COMMUNICATION_REQUEST message from the other interested WTRU (e.g., WTRU 3) may include the destination field set to the WTRU 1 L2 ID and a source field of the DIRECT_COMMUNICATION_REQUEST message may be set to the WTRU 3 L2 ID. The announced V2X service received by the initiating WTRU (e.g., WTRU 1) may be included in the DIRECT_COMMUNICATION_REQUEST message sent by the other interested WTRU (e.g., WTRU 3) to the initiating WTRU (e.g., WTRU 1). The initiating WTRU may initiate a mutual authentication with an interested WTRU (e.g., WTRU 2 or WTRU 3) upon receiving a message from the interested WTRU (e.g., WTRU 2 or WTRU 3).

Figure 7A:
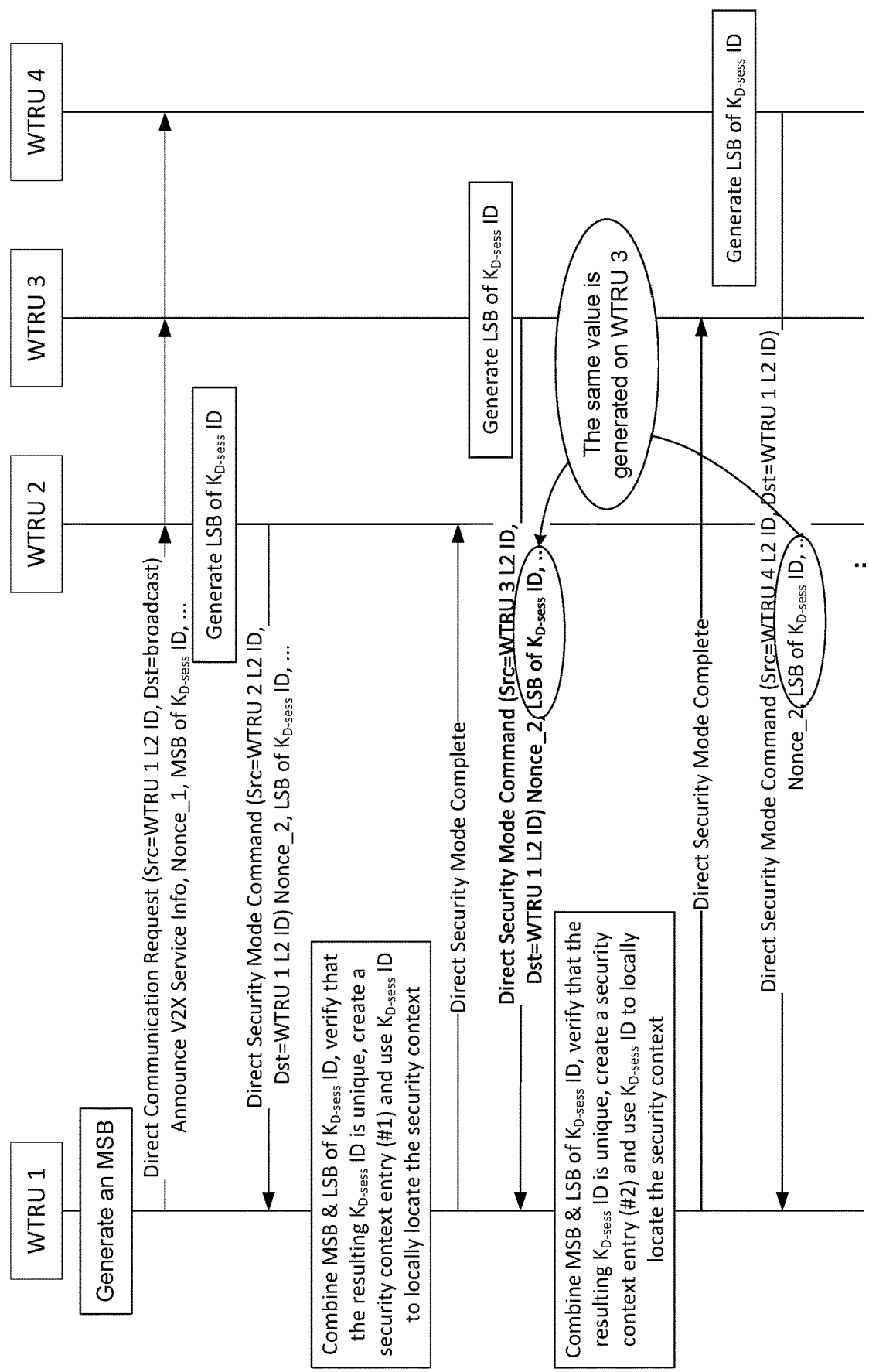
FIGS. 7A and 7B illustrate an exemplary V2X service oriented link establishment, for example, where a security context is based on the complete $K_{D\text{-}sess}$ ID.
Figure 7B:
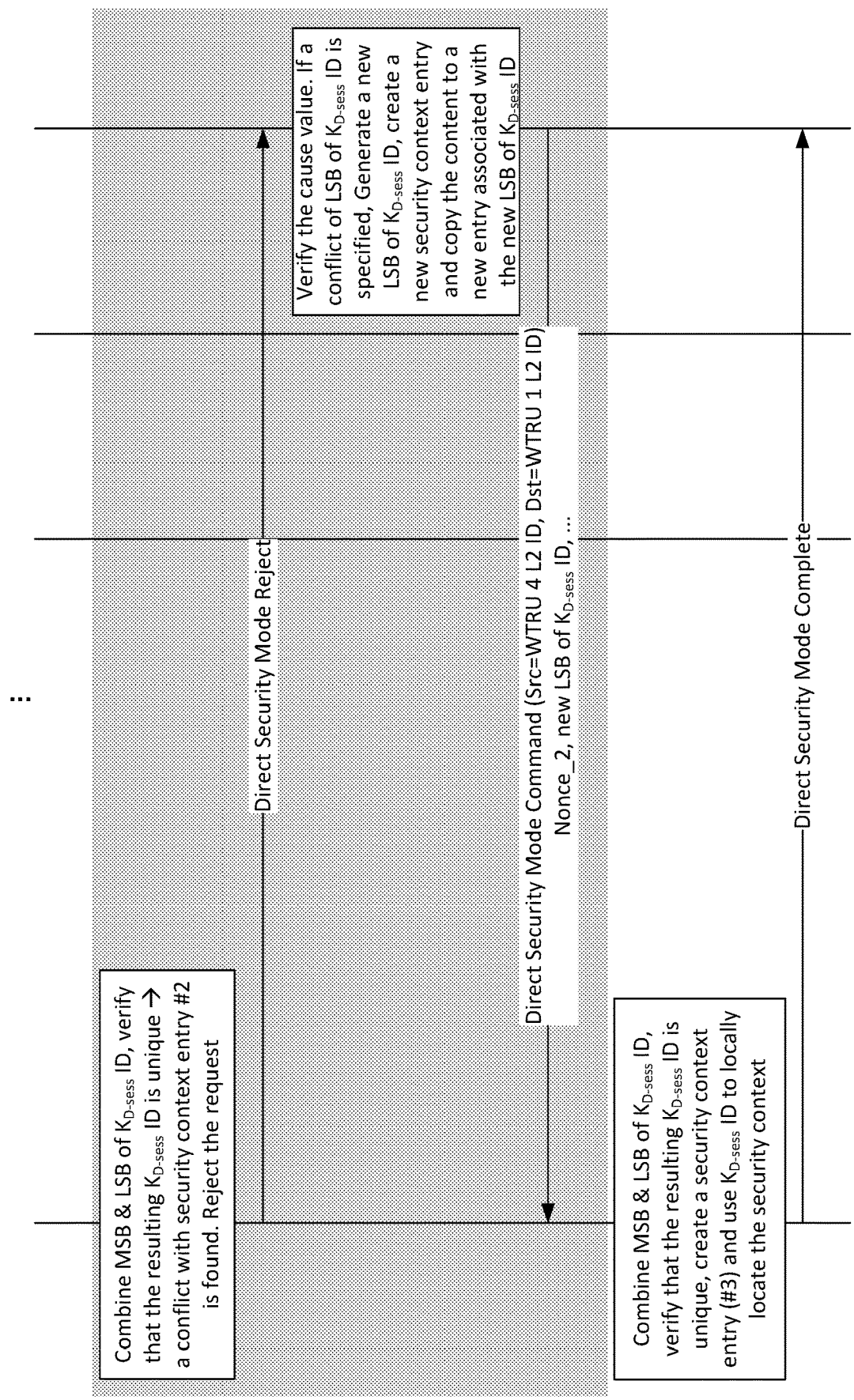

FIGS. 7A and 7B illustrate an exemplary V2X service oriented link establishment. A security context may be located based on a security context ID (e.g., a complete $K_{D-sess}$ ID). As illustrated in FIGS. 7A and 7B, the initiating WTRU (e.g., a first WTRU, WTRU 1) may use the entire security context ID (e.g., $K_{D-sess}$ ID) to locate a security context, for example, instead of using the MSBs of the security context ID (e.g., $K_{D-sess}$ ID). The initiating WTRU (e.g., the first WTRU, WTRU 1) may generate the entire security context ID (e.g., $K_{D-sess}$ ID) by combining (e.g., concatenating) a first security context ID associated with the initiating WTRU and a second security context ID from the peer WTRU (e.g., as received via a Direct Security Mode Command message from the peer WTRU (e.g., WTRU 2)). The entire security context ID may be a third security context ID. The resulting third security context ID (e.g., $K_{D-sess}$ ID) may be unique for each one-to-one link. The initiating WTRU may send a Direct Security Mode Complete message to the peer WTRU (e.g., WTRU 2).

As illustrated in FIGS. 7A and 7B, a first WTRU (e.g., an initiating WTRU) may send a direct communication request message. The direct communication request message may be sent via broadcast. The direct communication request message may include a first security context ID. For example, the first WTRU may generate the first security context ID. The first security context ID may be associated with the first WTRU. The first security context ID may include a set of MSBs of a security key ID (e.g., a $K_{D-sess}$ ID). The direct communication request message may include a list of supported V2X services. Multiple WTRUs may receive the broadcast direct communication request message. A second WTRU may send (e.g., in response to receipt of the broadcast direct communication request message) a direct security mode command message to the first WTRU. The first WTRU may receive the direct security mode command message. The direct security mode command message may include a second security context ID. For example, the second WTRU may generate the second security context ID. The second security context ID may be associated with the second WTRU. The second security context ID may include a first set of LSBs of the security key ID (e.g., the $K_{D-sess}$ ID). The direct security mode command message may indicate a V2X service from the list of supported V2X services. For example, the second WTRU may be interested in the V2X service. The first WTRU may determine a third security context ID, for example, by combining the first security context ID and the second security context ID. The third security context ID may include the set of MSBs and the set of LSBs of the security key ID. The first WTRU may establish a secure direct communication link with the second WTRU (e.g., using the third security context ID). The first WTRU may generate, based on the third security context ID, a security context entry for the secure direct communication link with the second WTRU. The second WTRU may receive a direct security mode complete message that may indicate that a secure direct communication link associated with the third security context ID has been established between first WTRU and the second WTRU.

A third WTRU may send a second direct security mode command message to the first WTRU. The first WTRU may receive the second direct security mode command message. The second direct security mode command message may include a fourth security context ID. The fourth security context ID may be associated with the third WTRU. The fourth security context ID may include a second set of LSBs of the security key ID. The first WTRU may determine whether the fourth security context ID is the same as the second security context ID. For example, the first WTRU may determine whether the first set of LSBs is the same as the second set of LSBs. When the fourth security context ID is the same as the second security context ID, the first WTRU may send a direct security mode reject message to the third WTRU. The direct security mode reject message may indicate that the second set of LSBs is not unique. The third WTRU may receive the direct security mode reject message. The third WTRU may determine that the fourth security context ID is not unique, for example, based on receipt of the direct security mode reject message. The third WTRU may generate a fifth security context ID, for example, in response to receipt of the direct security mode reject message. The fifth security context ID may be associated with the third WTRU. The fifth security context ID may include a third set of LSBs of the security key ID. The third WTRU may send a third direct security mode command message to the first WTRU. For example, the first WTRU may receive, in response to the direct security mode reject message, the third direct security mode command message from the third WTRU. The third direct security mode command message may include the fifth security context ID.

As illustrated in FIGS. 7A and 7B, a peer WTRU (e.g., WTRU 4) may generate a set of LSBs of a $K_{D-sess}$ ID that are already used by another peer WTRU (e.g., WTRU 3). In such a case, the formed $K_{D-sess}$ ID (e.g., the set of MSBs combined with the set of LSBs) may already exist on the initiating WTRU. When the formed $K_{D-sess}$ ID already exists at the initiating WTRU, the initiating WTRU may reject the Direct Security Mode Command message, for example, by sending a Direct Security Mode Reject message to the peer WTRU (e.g., WTRU 4). The Direct Security Mode Reject message may include a cause value indicating that the LSBs of the $K_{D-sess}$ ID are not unique (e.g., conflict of LSBs of the $K_{D-sess}$ ID). When the peer WTRU (e.g., WTRU 4) receives such a Reject message, may determine whether the cause value in the Reject message is related to a conflict of LSBs of the $K_{D-sess}$ ID. The peer WTRU (e.g., WTRU 4) may generate another set of LSBs of the $K_{D-sess}$ ID. The peer WTRU (e.g., WTRU 4) may copy a security context entry (e.g., information saved from a Direct Communication Request message received from the initiating WTRU, derived $K_{D-sess}$ key, PEK, PIK, etc.) associated with the rejected LSBs of the $K_{D-sess}$ ID into another security context created and associated with the other set of LSBs of the $K_{D-sess}$ ID. The peer WTRU (e.g., WTRU 4) may forget and/or discard the rejected set of LSBs of the $K_{D-sess}$ ID. The peer WTRU (e.g., WTRU 4) may send another (e.g., a renewed) Direct Security Mode Command message to the initiating WTRU indicating the other (e.g., newly generated) set of LSBs of the $K_{D\text{-}sess}$ ID. The peer WTRU may save (e.g., locally save) the other set of LSBs of the $K_{D\text{-}sess}$ ID.

A $K_{D\text{-}sess}$ ID formed with MSBs of the $K_{D\text{-}sess}$ ID and LSBs of the $K_{D\text{-}sess}$ ID may be unique for each peer WTRU (e.g., interested WTRU). An initiating WTRU may use the $K_{D\text{-}sess}$ ID value to store and/or locate the security context associated with a peer WTRU. One peer WTRU (e.g., a single peer WTRU) may be associated with a security context (e.g., even with the same MSBs of a $K_{D\text{-}sess}$ ID). Distinct $K_{D\text{-}sess}$ IDs with distinct LSBs of a $K_{D\text{-}sess}$ ID may be used for each security context (e.g., even if the same MSBs of a $K_{D\text{-}sess}$ ID are used). Distinct $K_{D\text{-}sess}$ IDs may be utilized for multiple unicast communications (e.g., with multiple interested WTRUs).

A WTRU may be configured to perform a V2X service oriented layer-2 unicast link establishment. A list of V2X services (e.g., instead of one V2X service) may be specified via a broadcast DIRECT_COMMUNICATION_REQUEST message. For example, a broadcast DIRECT_COMMUNICATION_REQUEST message may indicate the list of V2X services. A list of services in a DIRECT_COMMUNICATION_REQUEST message (e.g., instead of one V2X service per message) may reduce the number of messages that may be sent by the initiating WTRU, thereby reducing the number of messages that may be otherwise processed by the receiving WTRUs.

Figure 8:
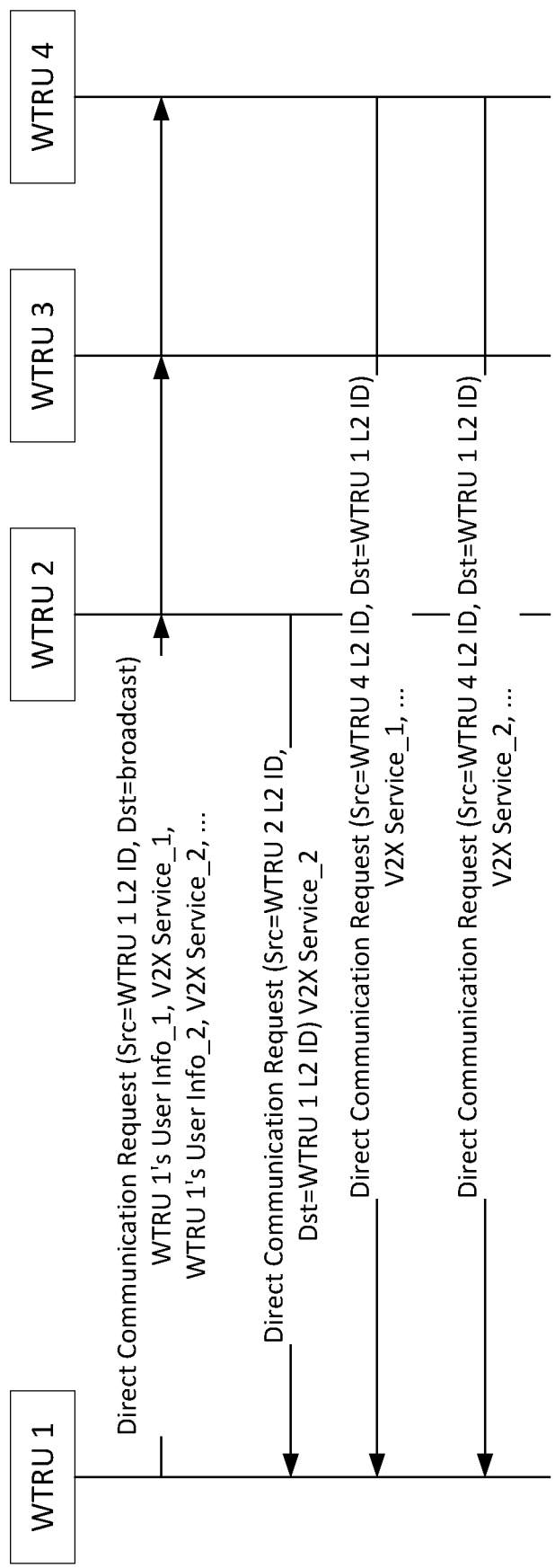
FIG. 8 illustrates an exemplary V2X service oriented layer-2 unicast link establishment with a list of V2X services.

FIG. 8 illustrates an exemplary V2X service oriented layer-2 unicast link establishment with a list of V2X services. As illustrated in FIG. 8, a Direct Communication Request broadcast message from an initiating WTRU (e.g., WTRU 1) may include information associated with a list of V2X services (e.g., instead of information associated with one V2X service). An initiating WTRU sending a list of services in a Direct Communication Request broadcast message may reduce the number of messages to be sent by the initiating WTRU. An initiating WTRU sending a list of services in a Direct Communication Request broadcast message may reduce the number of messages to be processed by the receiving WTRUs. For example, if a WTRU supports five V2X services, an initiating WTRU may use one message (e.g., instead of five messages) to advertise all five V2X services. Since the announcement messages may be repeated periodically, utilizing a single message to advertise all five V2X services may result in saving a considerable amount of messages (e.g., to be sent by the initiating WTRU and/or to be processed by the receiving WTRUs) over a period of time.

An initiating WTRU sending a list of services in a Direct Communication Request broadcast message may reduce the time required for connecting WTRUs for one or more (e.g., every) V2X services in the list of services. For example, a WTRU receiving a message advertising support of multiple services (e.g., five services) may trigger (e.g., immediately trigger) the link establishment for the V2X services of interest (e.g., if three V2X services are of interest for a receiving WTRU, three links may be setup concurrently). For example, the WTRU may trigger the link establishment without having to wait for the reception of additional messages announcing support of additional V2X services.

As illustrated in FIG. 8, an initiating WTRU (e.g., WTRU 1) may broadcast a DIRECT_COMMUNICATION_REQUEST message including a list of supported V2X services. The list of supported V2X services may include multiple V2X service IDs. Each V2X service ID may be paired with a user information (e.g., such as WTRU 1 User Info value). The user information may be provided for each V2X service and/or for each V2X application. As illustrated in FIG. 8, multiple receiving WTRUs (e.g., WTRU 2, WTRU 3, and/or WTRU 4) may receive the broadcast DIRECT_COMMUNICATION_REQUEST message from the initiating WTRU (e.g., WTRU 1). Each of the receiving WTRUs may process and decode the plurality of V2X services. A receiving WTRU (e.g., WTRU 2) may be interested in one V2X service. The receiving WTRU (e.g., WTRU 2) may initiate a unicast communication for the V2X service of interest, for example, as described herein. The receiving WTRU (e.g., WTRU 2) may send a DIRECT_COMMUNICATION_REQUEST message with the source ID as the layer-2 ID of the receiving WTRU (e.g., WTRU 2 L2 ID), and the destination ID as the layer-2 ID of the initiating WTRU (e.g., WTRU 1 L2 ID). The receiving WTRU (e.g., WTRU 2) may specify the service of interest in the DIRECT_COMMUNICATION_REQUEST message.

As illustrated in FIG. 8, a receiving WTRU (e.g., WTRU 4) may receive the broadcast DIRECT_COMMUNICATION_REQUEST message from the initiating WTRU (e.g., WTRU 1) advertising a list of services. A receiving WTRU (e.g., WTRU 4) may be interested in a plurality of V2X services out of the list of services it receives from the initiating WTRU. The receiving WTRU (e.g., WTRU 4) may initiate a unicast communication for the first V2X service that is of interest, as described herein. The receiving WTRU (e.g., WTRU 4) may send an initial DIRECT_COMMUNICATION_REQUEST message with the source ID as the layer-2 ID of the receiving WTRU (e.g., WTRU 4 L2 ID), and the destination ID as the layer-2 ID of the initiating WTRU (e.g., WTRU 1 L2 ID). The receiving WTRU may include the V2X service of interest in its DIRECT_COMMUNICATION_REQUEST message. The layer-2 ID of the initiating WTRU (e.g., WTRU 1 L2 ID) may use a value (e.g., a unique value) per service. A new source layer-2 ID may be added by the initiating WTRU during a link establishment and/or when sending a Direct Communication Accept message (not shown in the figure). An information element (IE) may be used to update a layer-2 ID. A peer WTRU may update its peer L2 ID with the value received via the IE. The peer WTRU may use the updated L2 ID for one or more subsequent communications. The receiving WTRU (e.g., WTRU 4) may initiate a unicast communication for each of the V2X services that are of interest, as described herein. The initiation of the unicast communication for each of the V2X services may be simultaneous.

Figure 9:
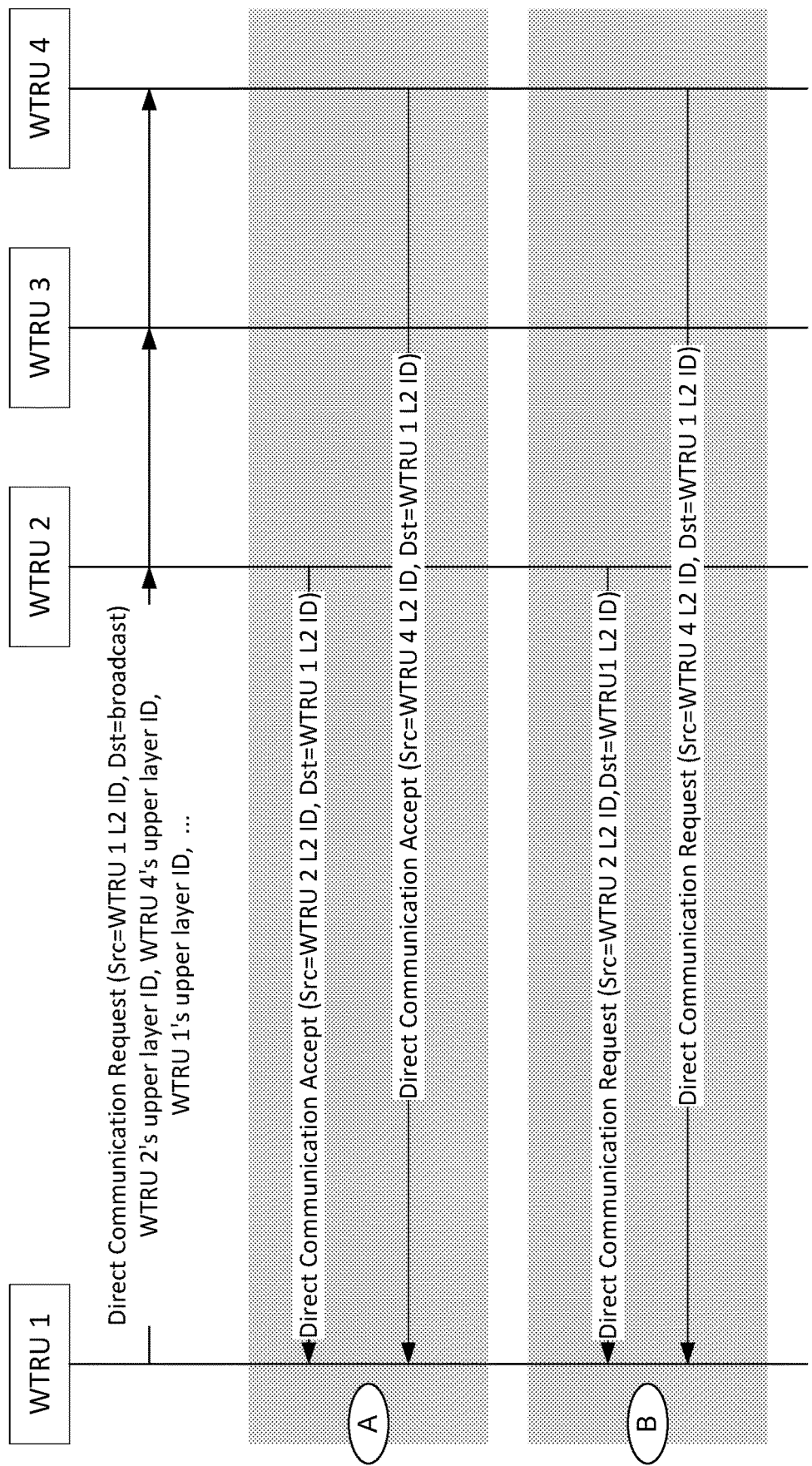
FIG. 9 illustrates an exemplary WTRU orientated layer-2 link establishment for a list of WTRUs using, for example, WTRUs' Upper Layer Info.

FIG. 9 illustrates an exemplary WTRU oriented layer-2 link establishment for a list of WTRUs using, for example, WTRUs' Upper Layer Info. As illustrated in FIG. 9, a Direct Communication Request broadcast message from an initiating WTRU (e.g., WTRU 1) may include upper layer information associated with each of the WTRUs. Sending one broadcast message including a list of WTRUs' upper layer IDs may reduce the number of messages that may be sent by the initiating WTRU. For example, an initiating WTRU, may send one Direct Communication Request broadcast message for multiple receiving WTRUs that the initiating WTRU may want to establish a link with (e.g., instead of sending a single message each of the plurality of receiving WTRUs).

A receiving WTRU, upon reception of a direct communication request broadcast message with a list of WTRUs' upper layer IDs, may determine if its upper layer ID is in the list. The receiving WTRU may process and decode the received direct communication request broadcast message.

If the receiving WTRU determines that its upper layer ID is in the list of WTRUs' upper layer IDs of the Direct Communication Request broadcast message, the receiving WTRU may trigger (e.g., immediately trigger) a layer-2 link establishment with the initiating WTRU. The receiving WTRU may establish the layer-2 link, for example, without waiting for reception of additional messages from the initiating WTRU.

As illustrated in FIG. 3, an initiating WTRU (e.g., WTRU-1) may broadcast a DIRECT_COMMUNICATION_REQUEST message with the destination upper layer ID of the WTRU it may desire to reach. Each of the receiving WTRUs (e.g., WTRU-2, WTRU-3, and WTRU-4) may receive the DIRECT_COMMUNICATION_REQUEST message. Each of the receiving WTRUs (e.g., WTRU-2, WTRU-3, and WTRU-4) may process and decode the DIRECT_COMMUNICATION_REQUEST message, and the WTRU specified in the DIRECT_COMMUNICATION_REQUEST message may respond. For example, if the initiating WTRU (e.g., WTRU-1) desires to establish a link with multiple WTRUs, the initiating WTRU may send the DIRECT_COMMUNICATION_REQUEST message multiple times (e.g., including each time the respective WTRU's upper layer ID).

As illustrated in FIG. 9, an initiating WTRU (e.g., WTRU 1) may broadcast a single DIRECT_COMMUNICATION_REQUEST message to multiple receiving WTRUs (e.g., WTRU 2, WTRU 3, and WTRU 4) with the upper layer IDs of the WTRUs the initiating WTRU may desire to reach. Each of the receiving WTRUs (e.g., WTRU 2, WTRU 3, and WTRU 4) may process and decode the received single broadcast DIRECT_COMMUNICATION_REQUEST message.

As illustrated in FIG. 9, a receiving WTRU (e.g., WTRU 2 or WTRU 4) may establish a layer-2 link by sending a response to the DIRECT_COMMUNICATION_REQUEST message received from the initiating WTRU (e.g., WTRU 1). A receiving WTRU (e.g., WTRU 2 or WTRU 4) may either send a Direct Communication Accept message (e.g., Option A), or a DIRECT_COMMUNICATION_REQUEST message of its own (e.g., Option B), as described herein.

As illustrated in FIG. 9, an initiating WTRU (e.g., WTRU 1) may broadcast a DIRECT_COMMUNICATION_REQUEST message with a list of destination upper layer IDs. Multiple receiving WTRUs (e.g., WTRU 2, WTRU 3, and WTRU 4) may receive the message. The plurality of WTRUs (e.g., WTRU 2, WTRU 3, and WTRU 4) may process and decode the multiple upper layer IDs. If a receiving WTRU (e.g., WTRU 2 or WTRU 4) determines that the list of destination upper layer IDs includes its own upper layer ID, the receiving WTRU may continue with the link establishment. Using Option A, the receiving WTRU (e.g., WTRU 2 or WTRU 4), for example after link authentication and security association, may send a DIRECT_COMMUNICATION_ACCEPT message to the initiating WTRU (e.g., WTRU 1) as a response to the received message. Using this Option A, the entire $K_{D\text{-}sess}$ ID may be used on initiating and receiving WTRUs to locally locate the security context. Using Option B, each of the replying WTRUs may not reply to the initiating WTRU's (e.g., WTRU 1's) DIRECT_COMMUNICATION_REQUEST message. One or more of the replying WTRUs may initiate a link establishment, for example, by sending respective DIRECT_COMMUNICATION_REQUEST message of their own.

What is claimed:

1. A first wireless transmit/receive unit (WTRU), the first WTRU comprising:
a processor, the processor configured to:
send a first message to a second WTRU, wherein the first message indicates a request to communicate with the second WTRU;
receive a second message from the second WTRU, the second message indicating a first set of least significant bits (LSBs) that is associated with the second WTRU;
generate a security key identifier using a set of generated most significant bits (MSBs) associated with the first WTRU and the first set of LSBs associated with the second WTRU;
determine that a conflict exists between the first set of LSBs that is associated with the second WTRU and a second set of LSBs that is associated with a third WTRU; and
send a third message to the second WTRU indicating the conflict between the first set of LSBs and a second set of LSBs.

2. The first WTRU of claim 1, wherein the first message comprises a list of supported vehicle to everything (V2X) services.

3. The first WTRU of claim 1, wherein the processor is further configured to send the third message to the second WTRU using the secure communication link if it is determined that the first set of LSBs is different from the second set of LSBs.

4. The first WTRU of claim 1, wherein the processor is further configured to send the third message to the second WTRU using the secure communication link if it is determined that the security key identifier is different from another security key identifier.

5. The first WTRU of claim 1, wherein the processor is further configured to send the third message to the second WTRU using the secure communication link indicating that the first set of LSBs is similar to the second set of LSBs, and receive a fourth message from the second WTRU, the fourth message indicating a third set of LSBs that is associated with the second WTRU.

6. The first WTRU of claim 1, wherein the processor is further configured to
send a fourth message to the third WTRU, wherein the fourth message indicating the conflict between the first set of LSBs and the second set of LSBs.

7. The first WTRU of claim 6, wherein the processor is further configured to receive a fifth message from the third WTRU, the fifth message indicating a third set of LSBs that is associated with the third WTRU.

8. The first WTRU of claim 7, wherein the security key identifier is a first security key identifier, and wherein the processor is further configured to send a sixth message to the third WTRU using a second secure communication link, wherein the second secure communication link is associated with a second security key identifier.

9. A method performed by a first wireless transmit/receive unit (WTRU) for establishing a communication link, the method comprising:
sending a first message to a second WTRU, wherein the first message indicates a request to communicate with the second WTRU;
receiving a second message from the second WTRU, the second message indicating a first set of least significant bits (LSBs) that is associated with the second WTRU;

generating a security key identifier using a generated set of most significant bits (MSBs) associated with the first WTRU and the set of LSBs associated with the second WTRU;

determining that a conflict exists between the first set of LSBs that is associated with the second WTRU and a second set of LSBs that is associated with a third WTRU; and sending a third message to the second WTRU indicating the conflict between the first set of LSBs and the second set of LSBs.

10. The method of claim 9, wherein the first message comprises a list of supported vehicle to everything (V2X) services.

11. The method of claim 9, wherein the method further comprises sending the third message to the second WTRU using the secure communication link if it is determined that the first set of LSBs is different from the second set of LSBs.

12. The method of claim 9, wherein the method further comprises sending the third message to the second WTRU using the secure communication link if it is determined that the security key identifier is different from another security key identifier.

13. The method of claim 9, wherein the method further comprises:
sending a fourth message to the second WTRU indicating the first set of LSBs is similar to the second set of LSBs, and
receiving a fifth message from the second WTRU, the fifth message indicating a third set of LSBs that is associated with the second WTRU.

14. The method of claim 9, wherein the method further comprises:
sending a fourth message to the third WTRU, the fourth message indicating the conflict between the first set of LSBs and the second set of LSBs; and
receiving a fifth message from the third WTRU, the fifth message indicating a third set of LSBs that is associated with the third WTRU.

15. The method of claim 14, wherein the security key identifier is a first security key identifier, and wherein the method further comprises sending a sixth message to the third WTRU using a second secure communication link, wherein the second secure communication link is associated with a second security key identifier.

16. A first wireless transmit/receive unit (WTRU) for establishing a communication link, the first WTRU comprising:

a processor, the processor configured to:
send a first message to a second WTRU, wherein the first message indicates a request to communicate with the second WTRU;
receive a second message from the second WTRU, the second message indicating a first set of least significant bits (LSBs) that is associated with the second WTRU;
generate a security key identifier using a set of generated most significant bits (MSBs) associated with the first WTRU and the first set of LSBs associated with the second WTRU;
determine whether a conflict exists between the first set of LSBs that is associated with the second WTRU and a second set of LSBs that is associated with a third WTRU; and
send a third message to the second WTRU using a secure communication link, wherein
if a conflict is determined to not exist, the secure communication link is associated with the security key identifier, or
if a conflict is determined to exist, indicate the conflict between the first set of LSBs and the second set of LSBs.

17. The first WTRU of claim 16, wherein the first message comprises a list of supported vehicle to everything (V2X) services.

18. The first WTRU of claim 16, wherein, if a conflict is determined to exist, the processor is further configured to send a fourth message to the third WTRU, the fourth message indicating the conflict.

19. The first WTRU of claim 18, wherein the processor is further configured to receive a fifth message from the third WTRU, the fifth message indicating a third set of LSBs that is associated with the third WTRU.

20. The first WTRU of claim 19, wherein the security key identifier is a first security key identifier, and wherein the processor is further configured to send a sixth message to the third WTRU using a second secure communication link, wherein the second secure communication link is associated with a second security key identifier.

21. The first WTRU of claim 16, wherein the third message indicates that the first set of LSBs is similar to the second set of LSBs, and receiving a fourth message from the second WTRU, the fourth message indicating a third set of LSBs that is associated with the second WTRU.

* * * * *